United States Patent
Wang

(10) Patent No.: US 10,122,199 B2
(45) Date of Patent: Nov. 6, 2018

(54) CHARGER AND CHARGING METHOD

(71) Applicant: CHERVON (HK) LIMITED, Wanchai (HK)

(72) Inventor: Zhuo Wang, Nanjing (CN)

(73) Assignee: Chervon (HK) Limited, Wanchai (HK)

( * ) Notice: Subject to any disclaimer, the term of this patent is extended or adjusted under 35 U.S.C. 154(b) by 80 days.

(21) Appl. No.: 15/278,240

(22) Filed: Sep. 28, 2016

(65) Prior Publication Data

US 2017/0093180 A1    Mar. 30, 2017

(30) Foreign Application Priority Data

Sep. 30, 2015 (CN) .......................... 2015 1 0643063

(51) Int. Cl.
*H02J 7/00* (2006.01)
*H01M 10/44* (2006.01)

(52) U.S. Cl.
CPC ............ *H02J 7/007* (2013.01); *H01M 10/44* (2013.01); *H01M 10/446* (2013.01); *H02J 7/0029* (2013.01); *H02J 7/0047* (2013.01); *H02J 7/0077* (2013.01); *H02J 2007/0037* (2013.01); *H05K 999/99* (2013.01)

(58) Field of Classification Search
CPC .. H02J 7/04; H02J 7/007; H02J 7/0042; H02J 7/0045; H02J 7/0073

USPC ................................................ 320/137, 149
See application file for complete search history.

(56) References Cited

U.S. PATENT DOCUMENTS

| | | | | |
|---|---|---|---|---|
| 5,442,274 A | * | 8/1995 | Tamai | H02J 7/0093 320/146 |
| 2005/0194938 A1 | * | 9/2005 | Sanpei | H02J 7/0073 320/141 |
| 2014/0300324 A1 | * | 10/2014 | Kikuchi | H01M 10/44 320/116 |

* cited by examiner

*Primary Examiner* — Paul Dinh
(74) *Attorney, Agent, or Firm* — Greenberg Traurig, LLP

(57) ABSTRACT

A method for charging a battery includes charging the battery with a constant charging power until a battery voltage reaches a predetermined voltage. After the battery voltage reaches the predetermined voltage, charging the battery with a first charging current at least once to a voltage threshold that exceeds the predetermined voltage. A charging time in the charging process with the first charging current for the first time is a predetermined value. Subsequent charges provided in the charging process with the first charging current is a changing value according to a battery capacity. The voltage threshold exceeding the predetermined voltage is changed according to voltage variations in the charging process with the first charging current.

9 Claims, 2 Drawing Sheets

CHARGER AND CHARGING METHOD

RELATED APPLICATION INFORMATION

This application claims the benefit under 35 U.S.C. § 119(a) of Chinese Patent Application No. CN 201510643063.3, filed on Sep. 30, 2015, the disclosure of which is incorporated herein by reference in its entirety.

FIELD OF THE DISCLOSURE

The present disclosure relates generally to a charger and a charging method for charging a battery.

BACKGROUND OF THE DISCLOSURE

With improving battery technology and increasing battery capacity, the charging time of a battery becomes longer and longer. For satisfying the requirements of power tools, the charging speed of known batteries needs to be improved so as to improve work efficiency and user experience.

The statements in this section merely provide background information related to the present disclosure and may not constitute prior art.

SUMMARY

In one aspect of the disclosure, a method for charging a battery is provided. The method includes charging the battery with a constant charging power until a battery voltage reaches a predetermined voltage, charging the battery with a first charging current, and charging the battery until the battery voltage reaches an actual voltage threshold. The actual voltage threshold is greater than the predetermined voltage.

In another aspect of the disclosure, a method for charging a battery is provided. The method includes charging the battery with a constant charging power until a battery voltage reaches a predetermined voltage, after the battery voltage reaches the predetermined voltage, charging the battery with a first charging current at least once, and charging the battery for at least once wherein a voltage threshold exceeds the predetermined voltage. A charging time in the charging process with the first charging current for the first time is a predetermined value, and a time later in the charging process with the first charging current is a changing value according to a battery capacity. The voltage threshold exceeding the predetermined voltage is changed according to voltage variations in the charging process with the first charging current.

In yet another aspect of the disclosure, a charger for charging a battery includes a charging module being capable of charging the battery with a constant charging power, a detecting module being capable of detecting battery voltage, and a control module being capable of receiving signals from the detecting module and controlling the charging module. The control module includes a timing unit for timing and a computing unit for computing data. The control module is operable to control the charging module to charge the battery with the constant charging power until the battery voltage reaches a predetermined voltage, and charge the battery with a first charging current for at least once after the battery voltage reaches the predetermined voltage, and charge the battery for at least once wherein a voltage threshold exceeds the predetermined voltage. The control module is operable to control the timing unit so as to set a charging time of the charging process with the first charging current for the first time as a predetermined value. The control module is operable to control time variations in the charging process with the first charging current after the first time according to the data from the detecting module and the timing unit. The control module is operable to set the voltage threshold greater than the predetermined voltage through the detecting module and the computing unit according to voltage variation of the battery in the charging process with the first charging current.

Further areas of applicability will become apparent from the description provided herein. It should be understood that the description and specific examples are intended for purposes of illustration only and are not intended to limit the scope of the present disclosure.

Figure 1:
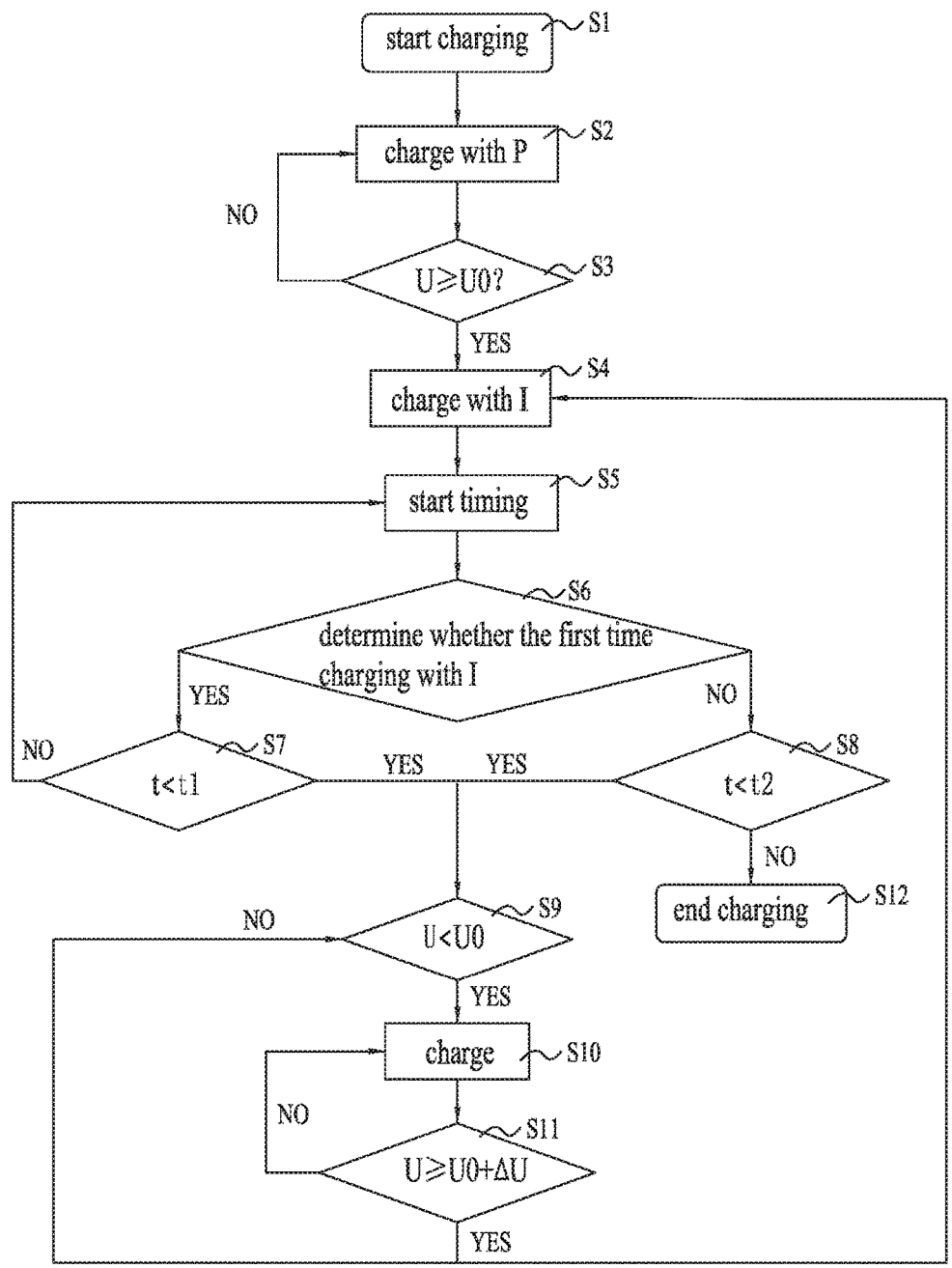
FIG. 1 is a flow diagram of an exemplary charging method.

The drawing described herein are for illustrative purposes only of selected embodiments and not all possible implementations, and are not intended to limit the scope of the present disclosure.

DETAILED DESCRIPTION

The following description of the preferred embodiments is merely exemplary in nature and is in no way intended to limit the invention hereinafter claimed, its application, or uses.

The following describes a charging method, the charging method generally includes the following steps: charging a battery with a constant charging power until a battery voltage reaches a predetermined voltage; charging the battery with a first charging current; and charging the battery until the battery voltage reaches an actual voltage threshold, wherein the actual voltage threshold is greater than the predetermined voltage.

Charging the battery with the constant charging power causes electrodes of the battery to produce some obstacles to the charging effect, so that a measured voltage of the battery does not represent an actual capacity of the battery. Thus, the battery is charged with the first charging current for a certain time and, the actual capacity of the battery can be obtained more exactly by detecting voltage variation of the battery being charged with the first charging current.

It is contemplated that, the battery cannot be fully charged with the original predetermined voltage. Thus, the actual voltage threshold greater than the predetermined voltage is used to realize the rapid and full charging of the battery.

The method and system hereinafter described provides the constant charging power to charge the battery to the predetermined voltage and then raises the predetermined voltage through charging with the first charging current for at least once and according to the voltage variation during the first charging current charging process, so as to realize the quick charging.

The first charging current is less than a current during the charging process with the constant charging power. Specifically, the first charging current is less than 0.5 c. The unit 'c' means an average current of the battery during charging or discharging processes with a rated capacity in an hour. However, the first charging current may be zero. In this embodiment, a new voltage threshold is defined as the actual voltage threshold. A difference between the actual voltage threshold and the predetermined voltage is equal to the voltage variation of the battery during the charging process with the first charging current. Or, the new voltage threshold is obtained by adding the original predetermined voltage with the voltage variation of the battery during the charging process with the first charging current. Further, the new voltage threshold is obtained by adding the original predetermined voltage with the voltage variation of the battery during the charging process with the first charging current for the first time.

In order to realize a complete charging process, the charging method may further include the following steps: determining whether the battery voltage is less than the predetermined voltage, when the battery voltage is less than the predetermined voltage, charging the battery until the battery voltage reaches the actual voltage threshold; when the battery voltage is greater than the predetermined voltage, charging the battery with the first charging current.

Thus, a voltage drop of the battery after every charging process with the first charging current can be determined, so that the actual capacity can be obtained.

When determining whether the battery is fully charged, a time factor needs to be considered. In the described method, determining whether the battery is fully charged is achieved by determining both whether the battery voltage is greater than or equal to the predetermined voltage and whether a duration that the battery voltage is greater than or equal to the predetermined voltage is greater than or equal to a predetermined time.

For shortening the charging time, a first charging time with the first charging current can be predetermined. After that, each charging time later with the first charging current depends on the actual capacity and characteristics of the battery. The first charging time is determined by cycle processes determining whether the battery is full. The first charging time is greater than a judgment time judging whether the battery voltage is stable.

As shown in FIG. 1, a specific procedure of the charging method includes steps as following:

S1: start charging;

S2: charge with constant charging power P;

S3: determine whether the battery voltage U is greater than or equal to the predetermined voltage U0, if yes, go to step S4, if not, return to step S2;

S4: charge with the first charging current I;

S5: start timing or start timing again;

S6: determine whether the charging process with the first charging current I is the first time, if yes, go to step S7, if not, go to step S8;

S7: determine whether the time t is less than a first predetermined time t1, if yes, go to step S9, if not, return to step S5;

S8: determine whether the time t is less than a second predetermined time t2, if yes, go to step S9, if not, go to step S12;

S9: determine whether the battery voltage is less than the predetermined voltage, if yes, go to step S10, if not, return to step S4;

S10: charge the battery, at this moment it is desired to consider the charging current value, the battery can be charged with the constant charging power, the constant current or a pulse charging with fixed pulse width;

S11: determine whether the battery voltage is greater than or equal to a sum of the predetermined voltage and the voltage variation ΔU during the charging process with the first charging current, if yes, return to step S4, if not, return to step S10; and S12: end charging.

It is noted that, before the charging process with the first charging current for the first time, because the charging time is relatively long, there is a large difference between the actual capacity and a capacity reflected by the battery voltage. So it is better to preset a relatively long charging time t1 which can reduce the times and time of discontinuously charging and determining later.

In other embodiment, the steps S6 and S7 can be omitted, and the charging can be achieved using a dynamic time interval method, the first charging current and the battery voltage can be used to compensate the charging. Further, the second predetermined time t2 may be predetermined for the first time, and then may be a dynamic value according to the voltage variation ΔU in the charging process with the first charging current.

Specifically, the voltage variation ΔU in step S11 can be the voltage variation of the battery in the charging process with the first charging current for the first time.

Figure 2:
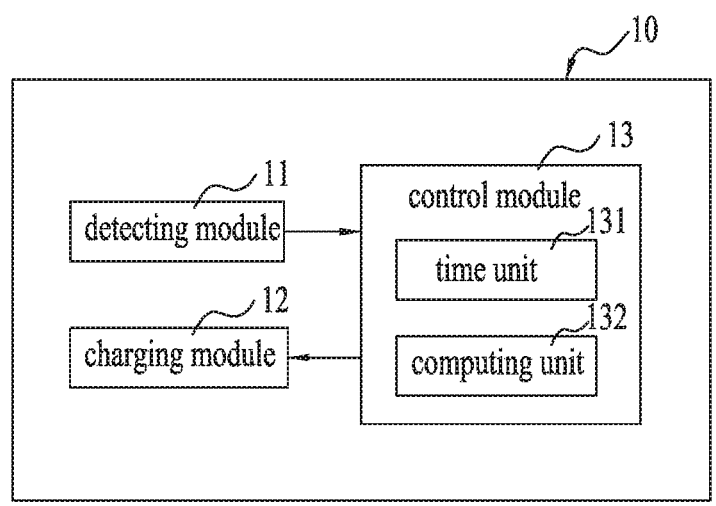
FIG. 2 is a block diagram of an exemplary configuration for a charger.

As shown in FIG. 2, a charger 10 for charging the battery mainly includes a charging module 12 being capable of charging the battery with the constant charging power, a detecting module 11 being capable of detecting the battery voltage, and a control module 13 being capable of receiving signals from the detecting module 11 and controlling the charging module 12. The control module 13 includes a timing unit 131 for timing and a computing unit 132 for computing data. The control module 13 is operable to control the charging module 11 to charge the battery with the constant charging power until the battery voltage reaches the predetermined voltage, and charge the battery with the first charging current for at least once after the battery voltage reaches the predetermined voltage, and charge the battery for at least once wherein the voltage threshold exceeds the predetermined voltage. The timing unit 131 is controlled by the control module 13 so as to set the time of the charging process with the first charging current for the first time as the predetermined time. The later charging time after the first time in the charging process with the first charging current is controlled as a changing value by the control module 13 according to the data from the detecting module 11 and the timing unit 131. The voltage threshold greater than the predetermined voltage is set by the control module 13 through the detecting module 11 and the computing unit 132 according to the voltage variation of the battery in the charging process with the first charging current.

The above illustrates and describes basic principles, main features and advantages of the present invention. Those skilled in the art should appreciate that the above embodiments do not limit the present invention in any form. Technical solutions obtained by equivalent substitution or equivalent variations all fall within the scope of the present invention.

What is claimed is:

1. A method for charging a battery, comprising:
    (a) charging the battery with a constant charging power until a battery voltage reaches a predetermined voltage; and
    (b) when the battery voltage reaches the predetermined voltage, charging the battery with a charging current for a predetermined charging time, wherein the charging current is less than a charging current during the charging with the constant charging power, wherein the charging time for the first time is a predetermined first value and the charging time is a changing value dependent upon a determined battery capacity, ending charging if the charging time is less than a predetermined second value; and (c) determining if the battery voltage is less than the predetermined voltage: if yes returning to step (b); if no, charging the battery until the battery voltage reaches an actual voltage threshold, exceeding the predetermined voltage, and returning to step (b).

2. The method of claim 1, further comprising, when the battery voltage is less than the predetermined voltage, further charging the battery with another constant charging power, a constant current, or pulses with a fixed pulse width.

3. The method of claim 1, further comprising determining whether the battery is fully charged.

4. The method of claim 3, further comprising, when the battery is fully charged, stopping the charging and, when the battery is not fully charged, charging the battery until the battery voltage reaches the actual voltage threshold.

5. The method of claim 4, wherein determining whether the battery is fully charged comprises determining whether the battery voltage is greater than or equal to the predetermined voltage and determining whether a duration that the battery voltage is greater than or equal to the predetermined voltage is greater than a predetermined time.

6. The method of claim 1, wherein a difference between a voltage of the battery when the charging process with the charging current is ended and the predetermined voltage is equal to a difference between the actual voltage threshold and the predetermined voltage.

7. The method of claim 1, wherein the voltage threshold that exceeds the predetermined voltage is changed according to voltage variations in the charging process with the charging current.

8. A charger for charging a battery, comprising:
a charging module for charging the battery with a constant charging power;
a detecting module for detecting a battery voltage; and
a control module for receiving signals from the detecting module and controlling the charging module, the control module comprising:
a timing unit for timing; and
a computing unit for computing data,
wherein the control module is operable to control the charging module to charge the battery with the constant charging power until the battery voltage reaches a predetermined voltage, to charge the battery with a charging current for a predetermined charging time, wherein the charging current is less than a charging current used during the charging with the constant charging power, wherein the charging time for the first time is a predetermined first value, and the charging time after the first time is a changing value determined by a battery capacity, and wherein the charging is ended if the charging time is less than a predetermined second value; and
wherein the control module is operable to control the charging module to determine if the battery voltage of less than the predetermined voltage: if yes, returning to the previous step; if no, charging the battery until the battery voltage reaches an actual voltage threshold that exceeds the predetermined voltage, and returning to the previous step.

9. The charger of claim 8, wherein the control module is operable to control the timing unit so as to set a first charging time of the charging process with the first charging current for the first time as a predetermined value, the control module is operable to control time variations in the charging process with the charging current after the first time according to the data of the detecting module and the timing unit, and the control module is operable to set the voltage threshold greater than the predetermined voltage through the detecting module and the computing unit according to voltage variation of the battery in the charging process with the first charging current.

* * * * *